Figure 1:
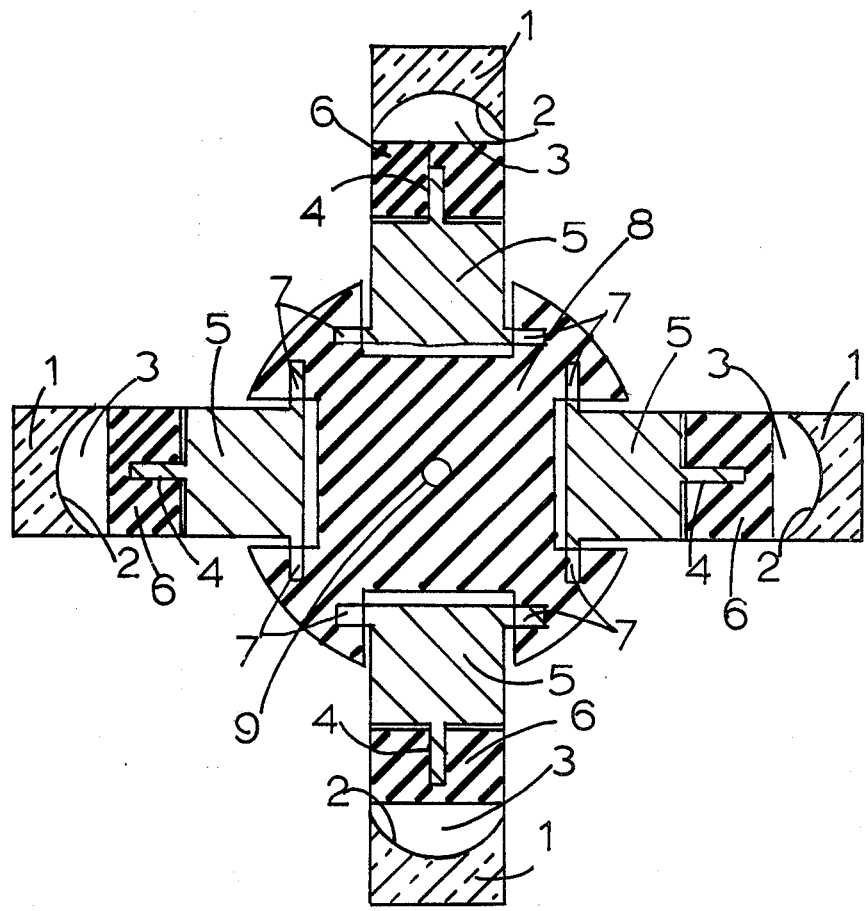

United States Patent [19]

Neefe

[11] 4,424,175

[45] Jan. 3, 1984

[54] SPIN CASTING

[76] Inventor: Charles W. Neefe, P.O. Box 429, Big Spring, Tex. 79720

[21] Appl. No.: 402,233

[22] Filed: Jul. 27, 1982

[51] Int. Cl.³ ............................................ B29D 11/00
[52] U.S. Cl. .................................. 264/2.1; 264/311; 425/808
[58] Field of Search ................. 264/1.8, 2.1, 2.5, 311; 425/808

[56] References Cited

U.S. PATENT DOCUMENTS

| | | | |
|---|---|---|---|
| 3,010,153 | 11/1961 | Bittner | 425/808 |
| 3,408,429 | 10/1968 | Wichterle | 264/2.1 |
| 3,660,545 | 5/1972 | Wichterle | 264/2.5 |
| 4,002,418 | 1/1977 | Wallace | 425/808 |

Primary Examiner—James B. Lowe

[57] ABSTRACT

A method of using centrifugal force to reduce the effects of surface tension, viscosity and gravity on the shape of the concave surface in the spin casting of contact lenses.

3 Claims, 1 Drawing Figure

SPIN CASTING

PRIOR ART

The art of spin casting contact lenses has been in use for nineteen years. The principal value of spin casting is its low cost and high production. The disadvantages are the lenses are not spherical and the aspheric surface is of a shape that increases the spherical aberration effect. The exact shape of the aspheric surface is most difficult to describe due to its being formed by several forces including gravity, centrifugal force, surface tension, viscosity of the liquid, capillary effects, diameter of the lens and radius of the concave mold.

These forces and the problems they create are discussed by O. Wichterle in his U.S. Pat. Nos. 3,660,545 and 3,408,429 and by W. F. Coombs in his paper No. 10-81-560 given at the meeting of the Contact Lens Manufacturers Association, Oct. 23, 1981, in New Orleans, La. The Panofocal concept described in Charles W. Neefe's U.S. Pat. No. 3,641,717 is widely used to reduce the effects of spherical aberration. The most frequent use of Panofocal lenses is to provide increased acuity for patients having uncorrected astigmatism. The Panofocal aspheric surface is on the convex or plus lens surface and of longer radius toward the lens edge and, therefore, reduces spherical aberration, improving the visual acuity of the wearer up to two lines Snellen. The aspheric surface formed on the concave or minus surface of a spin cast lens is also longer toward the edge, however, when the soft lens is placed on the eye and conforms to the shape of the eye, it results in a shorter radius toward the edge on the convex plus surface and greatly increases the spherical aberration effect. This has three disadvantages: (1) The usable optical zone in the center of the lens is reduced to 4 to 6 millimeters requiring the lens to center well. (2) The reduction in visual acuity due to increased spherical aberration effect. (3) Visual acuity will fluxuate with lens movement.

SUBJECT OF THE INVENTION

A method has been developed whereby the advantages of spin casting may be employed to produce lenses with reduced aberration effect, increased reproducability and predictability.

OBJECT OF THE INVENTION

The objective is to reduce the relative effect of the forces acting on the liquid lens material except centrifugal forces. This is accomplished by greatly increasing the centrifugal forces to the degree that all other forces acting on the liquid lens material are much less by comparison and exert little influence on the shape of the liquid lens material being cast.

HOW THE IMPROVEMENT IS ACCOMPLISHED

To accomplish this, a centrifuge is used to rotate a plurality of lens molds around a common center at speeds sufficient to create centrifugal force many times greater than the force of gravity. Each lens mold is rotated around its individual optical axis which is perpendicular to the common center of revolution of the lens mold. The rotational speed of each lens mold around the intended optical axis of the lens is much faster than would be possible without the centrifugal force provided by the molds rotating around their common center.

IN THE DRAWINGS

FIG. 1 shows the lens molds in section in the rotating positions extended outwardly from their center of rotation.

THE LENSES ARE MADE AS FOLLOWS

The required quantity of monomer containing a suitable catalyst is placed in the mold cavity 3 FIG. 1 on the concave optical surface 2 FIG. 1. The centrifuge disk 8 FIG. 1 is rotated around the axis 9 FIG. 1. As the speed of revolution increases the molds 1 FIG. 1 are extended outward from the center of rotation 9 FIG. 1. The outward extension is by movement provided by the pivot bearings 7 FIG. 1. The motors 5 FIG. 1 are activated rotating the mold 1 FIG. 1 on shaft 4 FIG. 1 around the intended optical axis of the lens. The mold support 6 FIG. secures the mold 1 FIG. to the motor shaft 4 FIG. 1. The rotating monomer is allowed to polymerize forming a lens having a predictable concave shape not influenced by surface tension, fluid viscosity or gravity. The lens is removed from the mold 1 FIG. 1 by hydrating the lens. The disposable molds 1 FIG. 1 are made by injection molding a resinous material such as nylon. The surface of the molds 1 FIG. 1 may be spherical, aspheric or lenticular in design or toric.

The following are representative formulations of the lens monomers: (percent by weight)

1. Ethylene glycol monomethacrylate—64.8
Diethylene glycol monomethacrylate—7.056
Ethylene glycol dimethacrylate—0.144
Water—20.9
Ammonium persulfate—1.1
2-dimethylaminoethyl acetate—6.0.

2. Ethylene glycol monomethacrylate—54.7
Diethylene glycol monomethacrylate—17.2
Diethylene glycol dimethacrylate—0.6
Ammonium persulfate—1.1
Dimethylaminoethyl acetate—5.8
Water—20.6.

3. Ethylene glycol monoacrylate—63
Diethylene glycol monoacrylate—11.6
Diethylene glycol dimethacrylate—0.4
Potassium persulfate—1.2
Water—20
Bis-(p-toluenesulfomethyl)-methylamine—3.8.

Various modifications can be made without departing from the spirit of this invention or the scope of the appended claims. The constants set forth in this disclosure are given as examples and are in no way final or binding. In view of the above, it will be seen that the several objects of the invention are achieved and other advantages are obtained. As many changes could be made in the above constructions and methods without departing from the scope of the invention, it is intended that all matter contained in the above description shall be interpreted as illustrative and not in a limiting sense.

I claim:

1. A method of reducing the effect of surface tension on the shape of the concave surface of spin cast contact lenses by revolving a plurality of concave lens molds around a common center, the molds concave optical surface being positioned toward the common center of rotation and revolving each lens mold around the intended lens optical axis and perpendicular to the common axis of rotation.

2. A method of reducing the effect of gravity on the shape of the concave surface of spin cast contact lenses by revolving a plurality of concave lens molds around a common center, the molds concave optical surface being positioned toward the common center of rotation and revolving each lens mold around the intended lens optical axis and perpendicular to the common axis of rotation.

3. A method of reducing the effect of fluid viscosity on the shape of the concave surface of spin cast contact lenses by revolving a plurality of concave lens molds around a common center, the molds concave optical surface being positioned toward the common center of rotation and revolving each lens mold around the intended lens optical axis and perpendicular to the common axis of rotation.

* * * * *